UNITED STATES PATENT OFFICE.

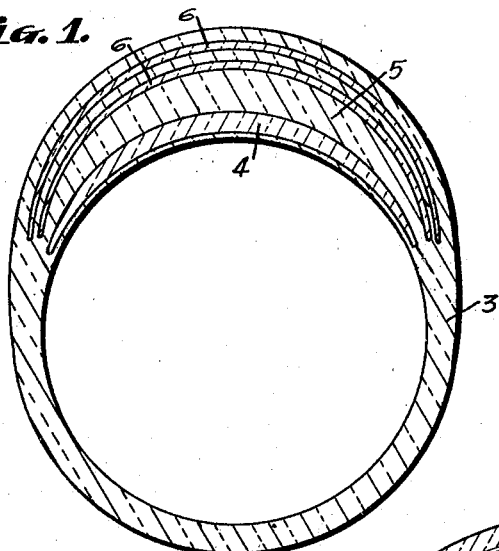
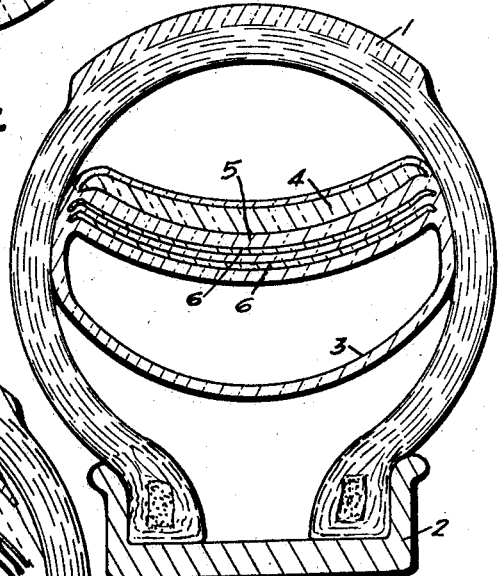
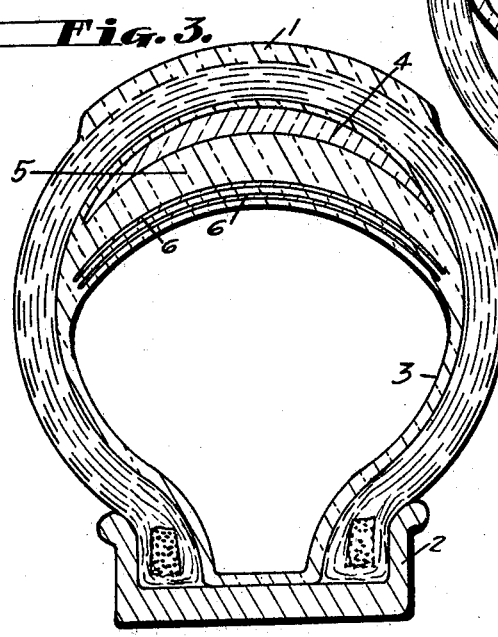

HENRY C. PRIVETT, OF LONG BEACH, CALIFORNIA, ASSIGNOR OF ONE-HALF TO CHARLES R. PRIVETT, OF BURBANK, CALIFORNIA, THREE-SIXTEENTHS TO HELEN E. PRIVETT AND ONE-SIXTEENTH TO HOLLIS F. PRIVETT, BOTH OF LONG BEACH, CALIFORNIA.

INNER TUBE.

1,399,575.  Specification of Letters Patent.  Patented Dec. 6, 1921.

Application filed January 3, 1921. Serial No. 434,686.

*To all whom it may concern:*

Be it known that I, HENRY C. PRIVETT, a citizen of the United States, residing at Long Beach, in the county of Los Angeles and State of California, have invented new and useful Improvements in Inner Tubes, of which the following is a specification.

It is the object of this invention to provide an inner tube for pneumatic tires which is so arranged as to close or seal any ordinary puncture that may occur in the tire. The invention also provides a structure which will protect the tube against puncture, but the main object of the construction is to positively seal a puncture should the same occur.

More specifically the invention contemplates the provision of a tube structure including an outer portion of relatively hard rubber and adapted to protect the tube against puncture, and an inner portion of relatively soft rubber which is compressed when the tube is inflated, due to the peculiar construction of the same, so that if the tube is punctured, this relatively soft rubber will tend to close and seal the puncture. The invention also provides for positioning a gummy substance, which does not cure, as does the rubber forming the inner portion of relatively soft compressed rubber. This gummy substance may be guayule, which is distinguished by the maintenance of its gummy and glutinous characteristics in the presence of the heat employed in the manufacture of the tube. This gummy substance will tend to enter any puncture in the tube, and the filling of the puncture with said gummy substance, and the compression of the inner portion of the tube tending to close the puncture, will form an efficient seal which will prevent the escape of air and will restore the tube to its leak proof condition.

The inner tube constructed in accordance with the present invention is so molded or shaped that when deflated the tread portion thereof is of greater area or extent than when inflated. By this construction when the tube is inflated the inner portion of the tread of the tube is under compression. As previously stated this inner portion which is under compression is of relatively soft rubber, having the guayule embedded therein, while the outer portion of the tread of the tube is of relatively hard rubber, which will form a substantially non-extensible member arranged to maintain the outer portion of the tread of the tube of constant size, and thus cause compression of the inner portion of the tread, when the shape of the tread portion of the tube is changed through inflation as above set forth.

By forming the outer tread portion of the tube of relatively hard rubber, it will remain sufficiently non-extensible to cause compression of the inner portion of the tube as described, while at the same time it will possess sufficient elasticity to give at its meeting edges with the relatively soft rubber of the tube stock, and as a consequence the possibility of the hard rubber cracking or pulling away from the soft rubber at said meeting edges is eliminated.

In practice the tube is so constructed that a thin layer of the relatively soft rubber stock will extend over the tread surface of the relatively hard rubber, and thereby overlie the meeting edges of the hard rubber with the soft rubber stock so as to distribute the strain at the meeting edges. By this construction the possibility of splitting at the meeting edges is still further overcome.

The invention will be readily understood from the following description of the accompanying drawings, in which:

Figure 1 is a transverse section through an inner tube constructed in accordance with the invention, and showing the same turned wrong side out as it is formed upon a mandrel.

Fig. 2 is a transverse section through a typical tire casing having an inner tube constructed in accordance with the present invention received therein, and in deflated condition.

Fig. 3 is a similar view showing the inner tube inflated.

In the drawings, I have illustrated a usual tire casing 1 mounted upon a rim 2, the illustrations of these parts representing simply a typical construction and not being intended to limit the inner tube forming the subject matter of the present invention to any particular type of tire casing.

The inner tube as in the usual practice is constructed upon a mandrel and turned wrong side out, and the arrangement of the inner tube when in this position and as illustrated in Fig. 1, will first be described. The foundation of the inner tube is shown at 3 and may be of usual inner tube stock which is relatively soft rubber. A strip 4 is embedded in the rubber stock 3 adjacent the surface of the tube which forms the outer tread surface of the finished product. This strip is of relatively hard rubber such as the stock generally employed for the outer surface of a usual tire casing. This strip is so molded that the cross sectional configuration thereof is as illustrated in Fig. 1, with the middle portion thereof comparatively thick and tapering toward its side edges. It will be understood that this strip is curved in cross section so as to conform to the cross sectional curvature, and that it is spaced from the tread surface of the tube but a slight distance and with a thin layer of the tube stock 3 overlying the same.

The portion of the tube stock 3 beyond the strip 4 is of increased thickness at its middle portion as shown at 5, and tapers gradually into the portion of the tube stock which is opposite the tread portion at the ends of strip 4.

Embedded within this thickened portion 5 of the tube are one or more layers of guayule as shown at 6. These layers are radially spaced one beyond another and the outer layer of the same is spaced from the surface of the tube by an overlying layer of the tread stock. The layers of guayule are curved in cross section to conform to the curvature of the tube and extends substantially the width of the tread portion of the tube which is substantially the same width as that of the strip 4. The guayule forming layers 6 possesses the peculiar property of remaining in a sticky condition even after the tube has been heated in the course of its manufacture, and as a consequence the guayule forms layers in the finished tube of material of a glutinous and sticky composition, which will readily enter openings formed in such layers, so as to seal the same with the sticky mass of the composition.

The tube having been formed as thus described, is removed from its mandrel by turning it wrong side out, as is the usual practice, and the ends of the tube are then sealed to form the finished annular tube.

As illustrated in Fig. 2, when the finished tube is placed in tire casing 1, and is in its deflated condition, the tread portion 5 of tube stock 3 is of uniform density throughout, and the tread strip 4 is also of uniform density. It will be noted that the central or middle portion of strip 4 is smaller in diameter than its outer or side portions, and that the tread portion 5 of the relatively soft tube stock is so positioned that its inner surface is of less extent than when it is inflated. It will also be observed that the side edges of strip 4 anchor the side edges of the tread portion of tube stock 3.

When the tube is inflated as shown in Fig. 3, the tread portion of the tube is forced outwardly until its outer surface bears against the inner wall of the tire casing. Strip 4 being of relatively hard rubber, it is relatively non-extensible as compared to the tread portion 5 of the relatively soft rubber tread stock, and as a consequence the outer portion of the tread will not expand appreciably in conforming to the inner wall of the tire casing. When the tube is inflated, the inner portion of the tread is considerably less in area or extent than it was in its normal deflated condition. This decrease in area of the inner portion of the tread is accompanied by a considerable increase in density, or compression of the material forming tread portion 5 of the soft rubber stock. It will thus be noted that this compressed soft rubber tube stock will tend to close a puncture, and since the inner portion of the tread is under lateral compression, it will offer considerable resistance to members tending therethrough. As a consequence it will prevent the tube being punctured by many objects, which under ordinary circumstances would severely damage an inner tube.

Should the tube be punctured, the withdrawal of the puncturing object will not leave an opening in the tube, since the soft rubber of the tube stock will immediately close and tightly seal the opening due to its compressive action.

In the event that such an opening is formed in the tube, it will also be noted that the layers 6 of gummy non-curable material, such as guayule, will also be forced by the compression of the inner portion of the tread into the opening formed in the tube, so as to assist in the sealing of the puncture.

I have thus provided an inner tube, which not only forms protection against puncturing of the same, but is also so constructed that the inner portion of the tread is under compression when the tube is inflated, so that the compression action of this inner portion of the tread will tend to close any puncture that should occur, and will also force a gummy material embedded in the inner portion of the tread into such a puncture so as to positively seal the same.

The provision of a retaining strip 4, which is sufficiently non-elastic to maintain the soft rubber stock under compression, while permitting slight stretching of said strip, will eliminate excessive strain at the meeting edges of the retaining strip, and as a consequence the parts will not pull apart at said meeting edges. This tendency to pull apart is still further overcome by the provision of a layer of the soft rubber stock over the retaining strip, so as to completely overlie the side edges of said strip.

Various changes may be made without departing from the spirit of the invention as claimed.

What is claimed is:

1. An inner tube for tires formed of relatively soft stock and having a strip at the outer portion of the tread of relatively hard stock so that when the tube is inflated, said strip will expand but slightly transversely of the tube so as to substantially anchor the side edges of the inner portion of the tube against transverse expansion and thereby compress said portion of the tube.

2. An inner tube for tires formed of relatively soft stock having a normal configuration in which its inner surface is of less extent than when it is inflated, and a strip at the outer portion of the tread of relatively hard stock so that when the tube is inflated, said strip will expand but slightly transversely of the tube so as to substantially anchor the side edges of the inner portion of the tube against transverse expansion and thereby compress said portion of the tube.

3. An inner tube for tires of relatively soft stock and having a strip of relatively hard stock at the portion of the tread which is turned inward when the tube is formed upon a mandrel, so that when the tube is reversed, said strip will be turned outward, and being relatively non-expandible transversely, will anchor the side edges of the relatively soft portion of the tube now turned in so as to prevent transverse expansion thereof, and thereby compress said portion of the tube.

In testimony whereof I have signed my name to this specification.

HENRY C. PRIVETT.